United States Patent [19]
Riday

[11] Patent Number: 5,177,616
[45] Date of Patent: Jan. 5, 1993

[54] STOWABLE VIDEO DISPLAY ASSEMBLY

[75] Inventor: Richard B. Riday, Kirkland, Wash.

[73] Assignee: Matsushita Avionics Systems, Bothell, Wash.

[21] Appl. No.: 801,803

[22] Filed: Dec. 2, 1991

[51] Int. Cl.⁵ .............................................. H04N 5/64
[52] U.S. Cl. .................................... 358/254; 358/229; 358/248; 358/249; 248/917; 248/919; 248/921; 248/923; 297/217
[58] Field of Search ............... 358/229, 248, 249, 254; 248/917, 918, 919, 920, 921, 922, 923, 924, 278; 297/194, 145

[56] References Cited

U.S. PATENT DOCUMENTS

| | | | |
|---|---|---|---|
| 3,428,286 | 2/1969 | Pesco | 248/278 |
| 3,608,101 | 9/1971 | Castro et al. | 299/217 |
| 4,562,482 | 12/1985 | Brown | 358/254 |
| 4,584,603 | 4/1986 | Harrison | 358/254 |
| 4,647,980 | 3/1987 | Steventon et al. | 358/254 |
| 4,756,528 | 7/1988 | Umashanker | 358/254 |
| 4,826,245 | 5/1989 | Entratter | 248/917 |
| 4,868,888 | 9/1989 | Dayton | 297/194 |
| 4,982,996 | 1/1991 | Vottero-Fin et al. | 297/194 |

FOREIGN PATENT DOCUMENTS

| | | |
|---|---|---|
| 90902831.8 | 2/1990 | European Pat. Off. |
| 2-00180 | 2/1990 | Japan |

Primary Examiner—Edward L. Coles, Sr.
Assistant Examiner—Fan Lee
Attorney, Agent, or Firm—Amster, Rothstein & Ebenstein

[57] ABSTRACT

A video display assembly, suitable for use in an airplane seat, includes a video display and a chamber configured and dimensioned to receive the display when the display is disposed in a first substantially vertical plane. The display is connected to the chamber by an arm having a pair of end portions and a shank portion intermediate the end portions, a proximal one of the end portions being secured to the chamber and a distal other of the end portions being secured to the display. The proximal one arm end portion is pivotable in the first substantially vertical plane relative to the chamber to move the display between a stow orientation wherein the display is stowed in the chamber and an intermediate orientation wherein the display is outside of the chamber. The shank portion is pivotable in a substantially horizontal plane relative to the proximal one arm end portion to move the display between the intermediate orientation and a generally vertical use orientation wherein the display is in a second plane. The distal other arm end portion is pivotable relative to the shank portion to tilt the display between the generally vertical use orientation and a tilted use orientation wherein the display is tilted relative to the second plane for ease of viewing.

25 Claims, 15 Drawing Sheets

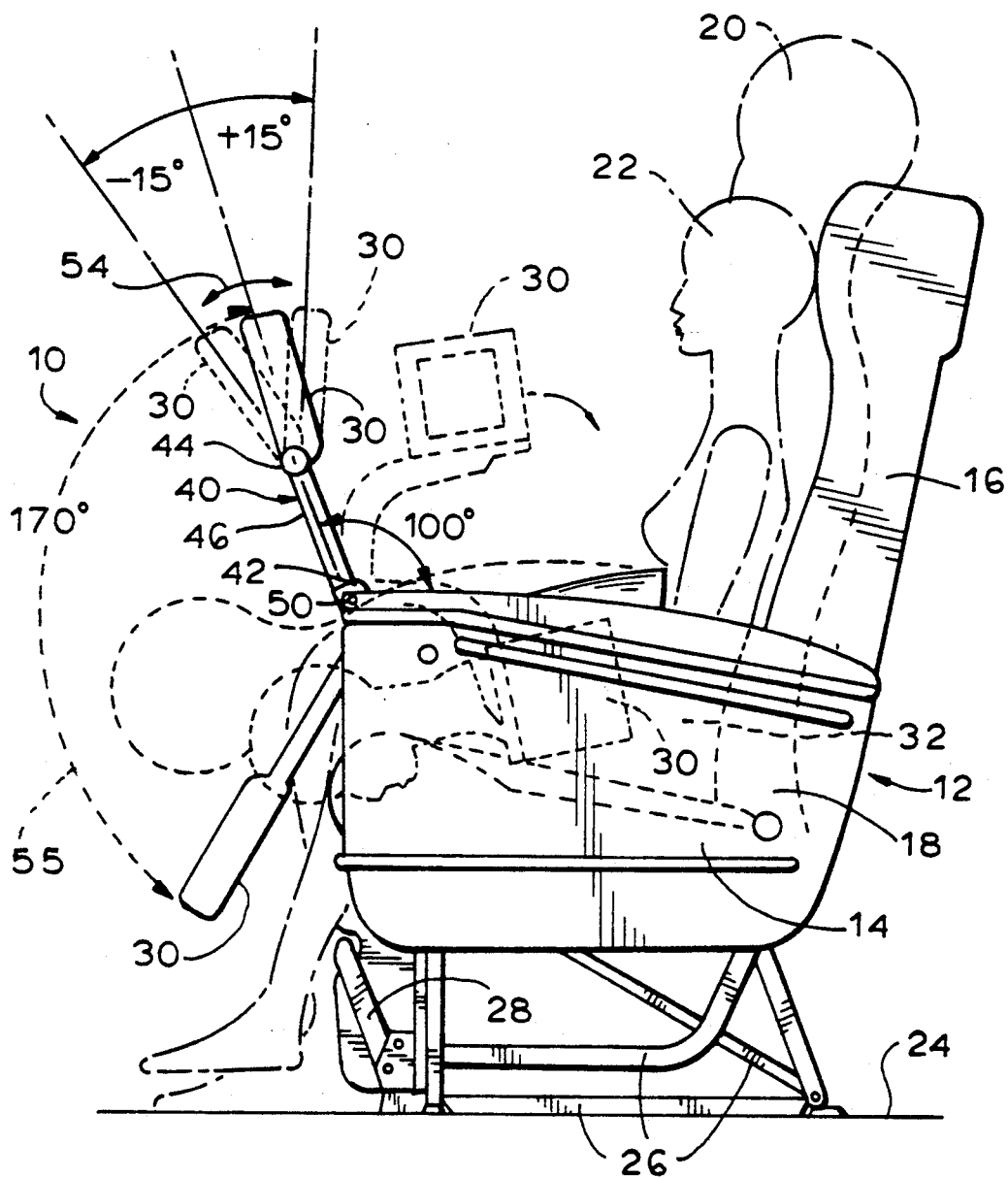
F I G. 1

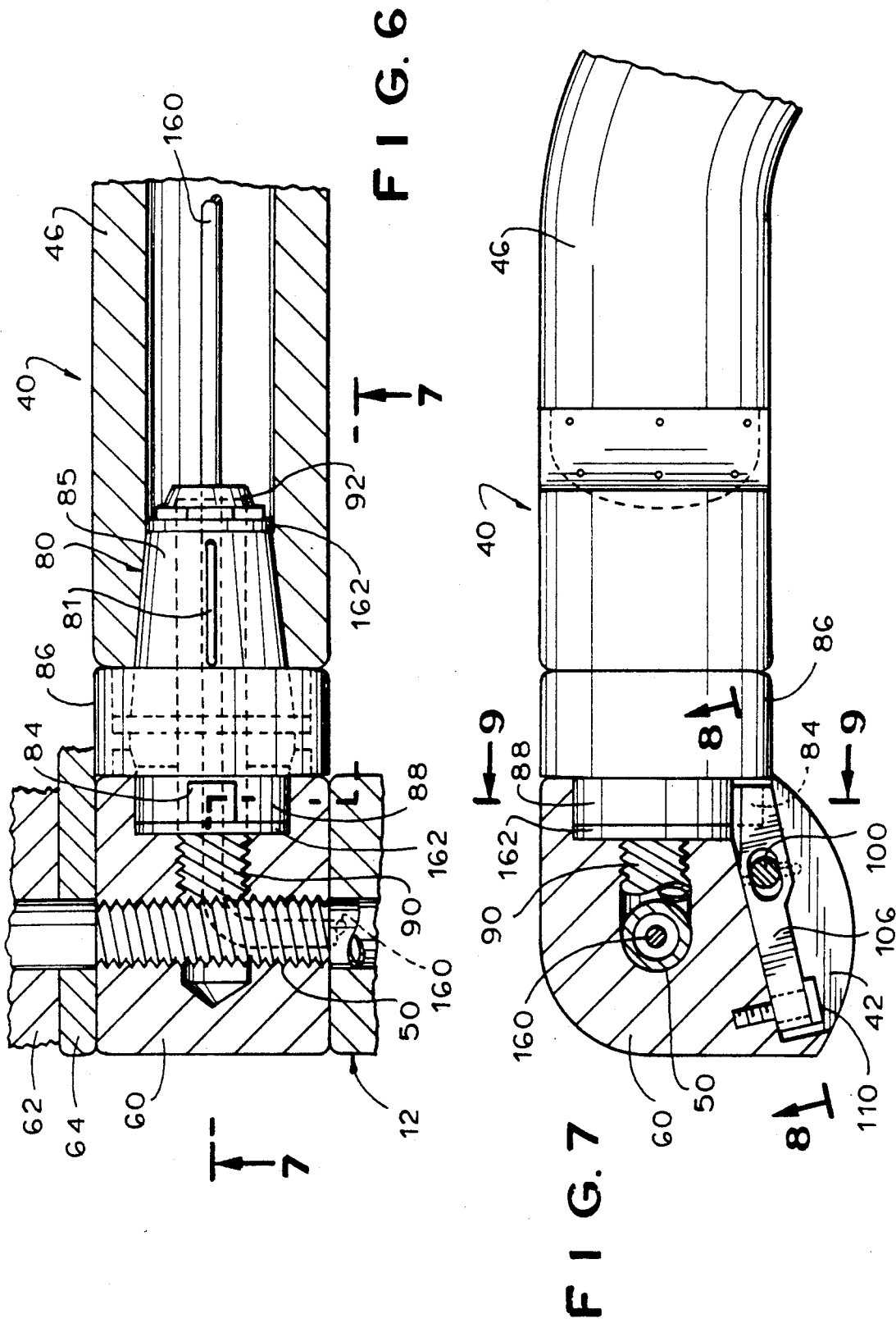

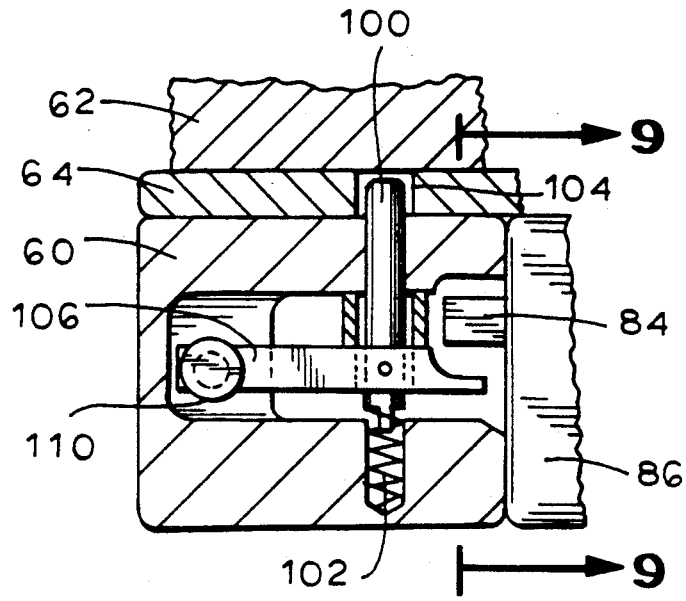
F I G. 8
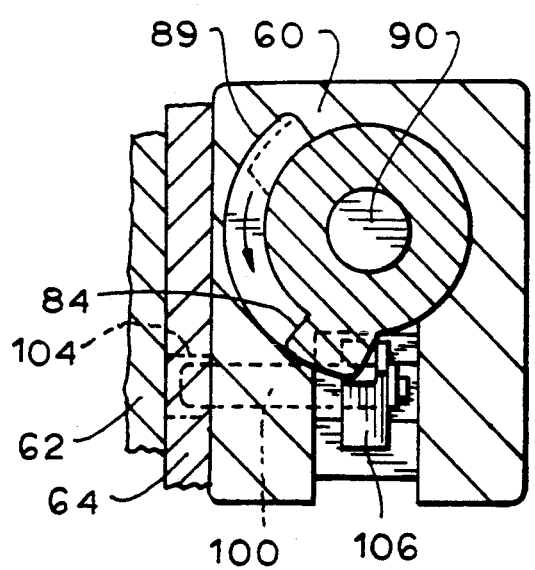
F I G. 9

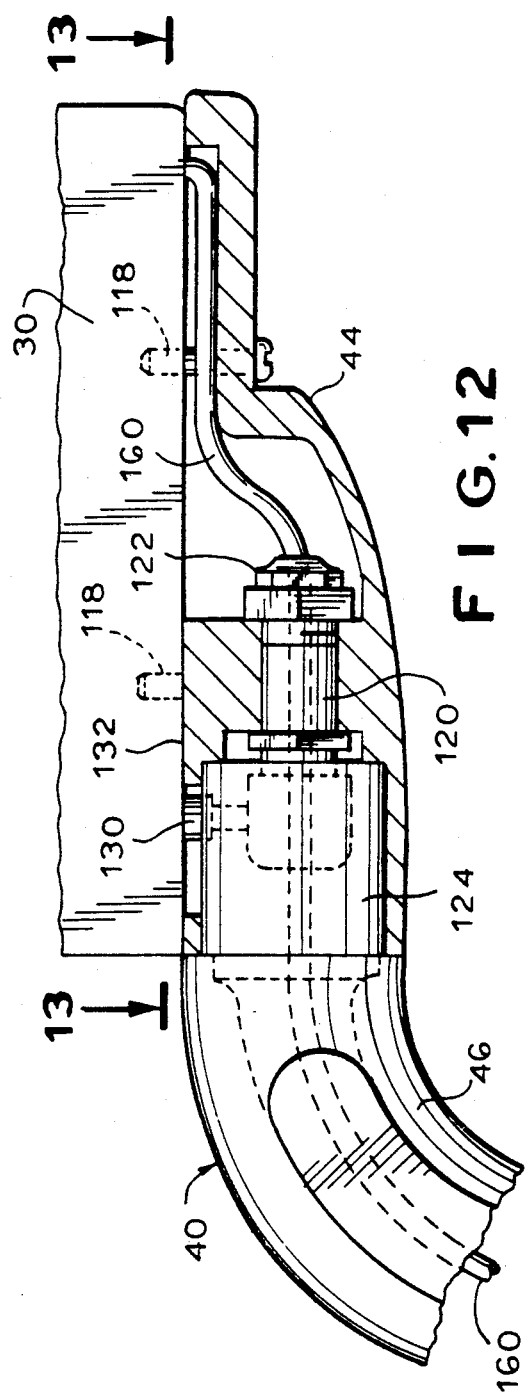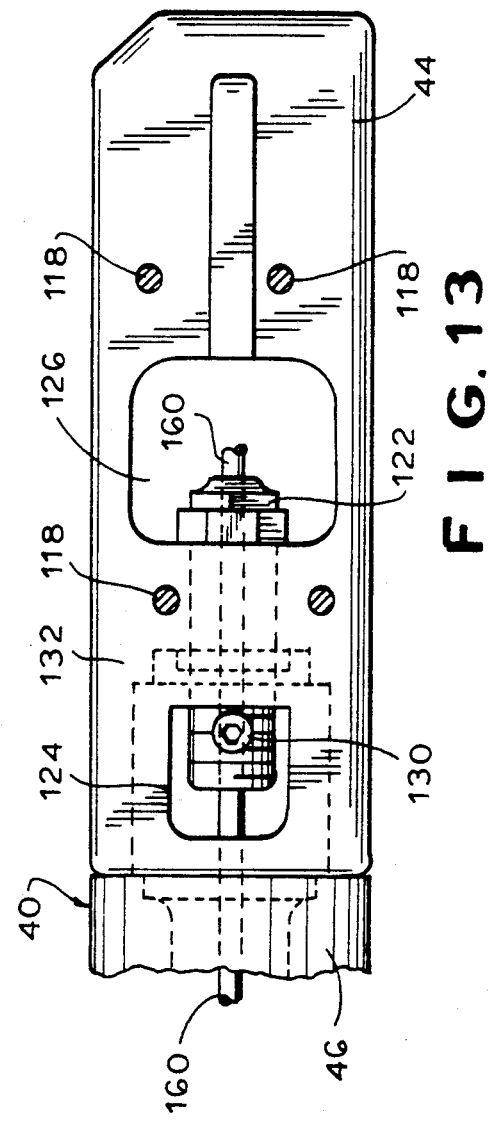

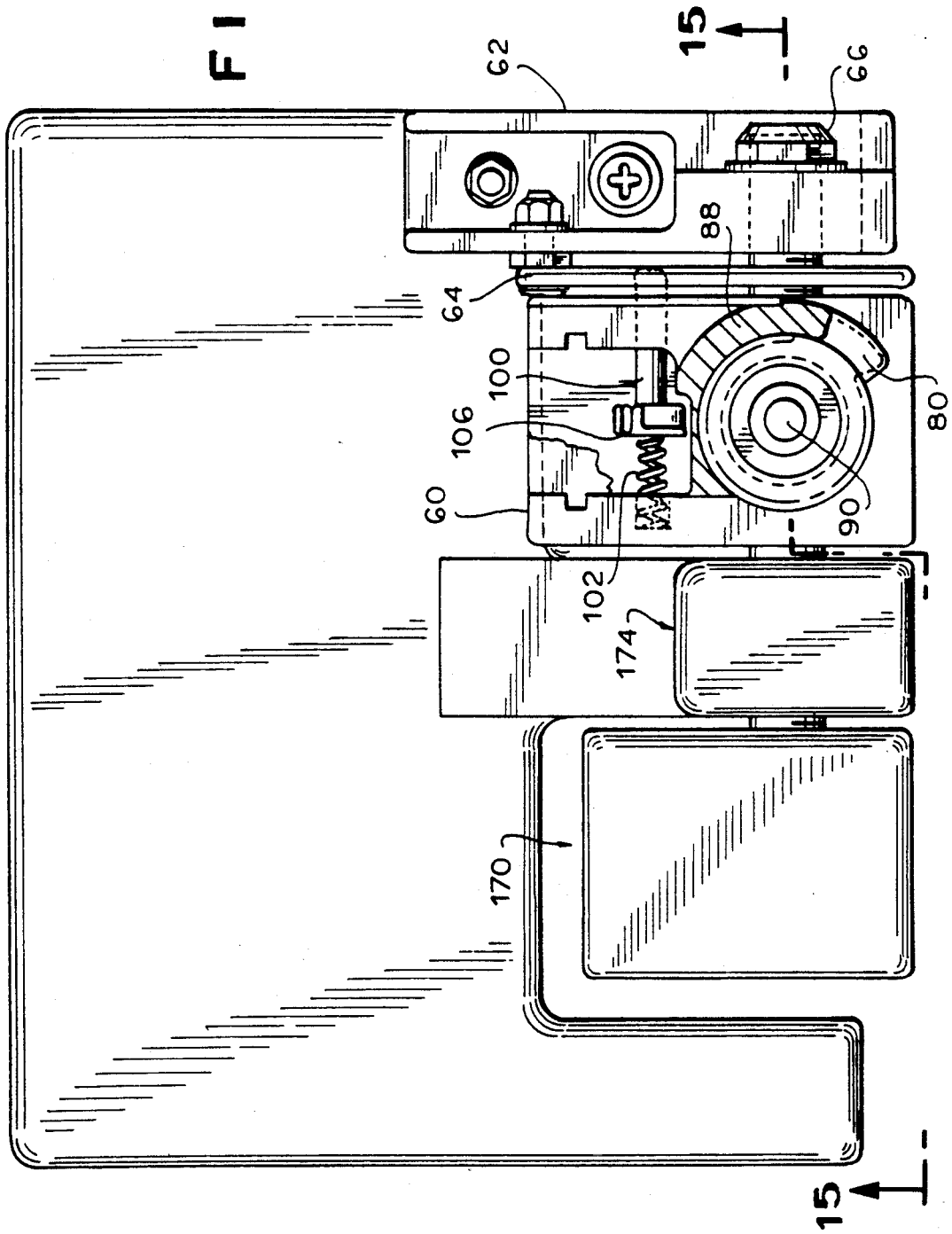

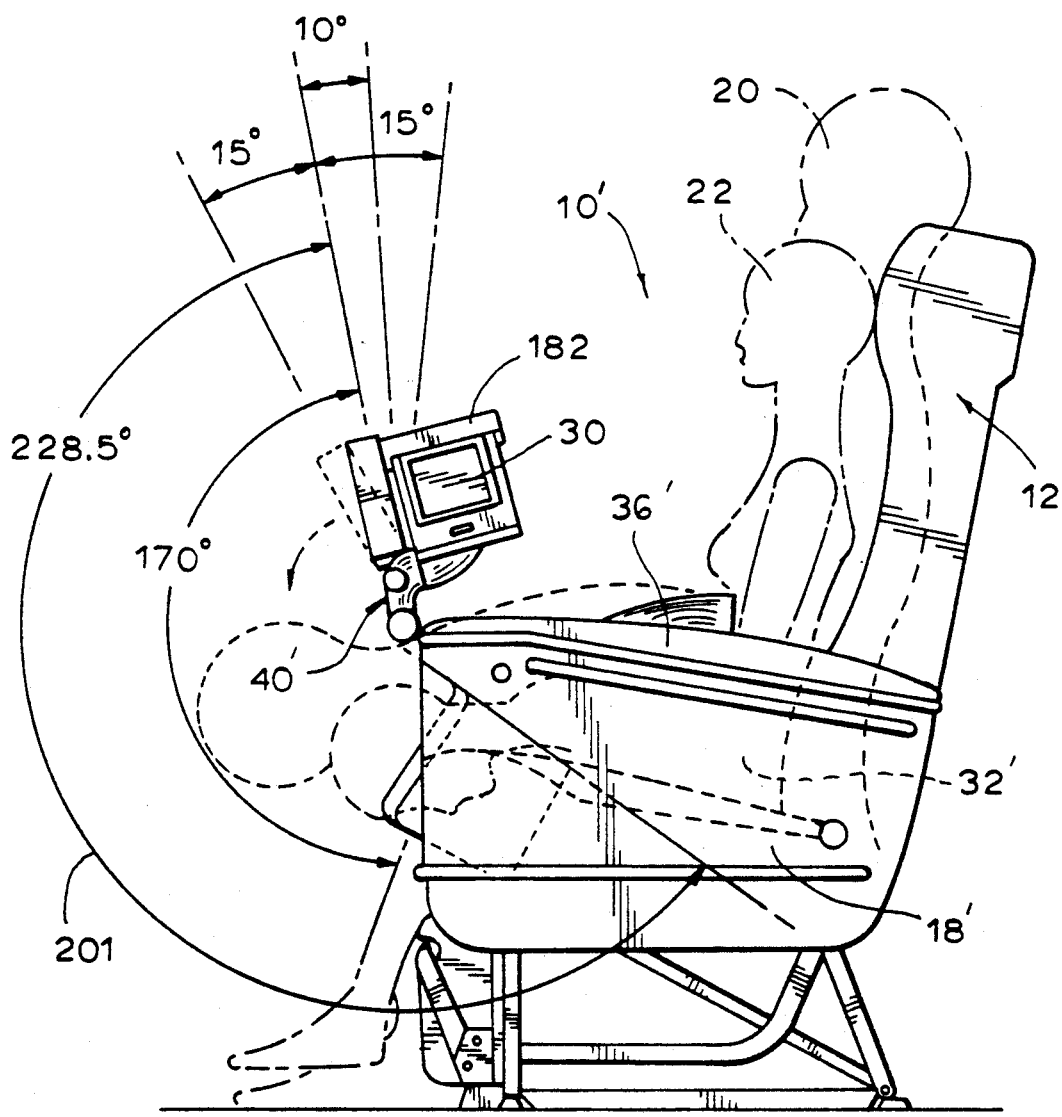
F I G. 18

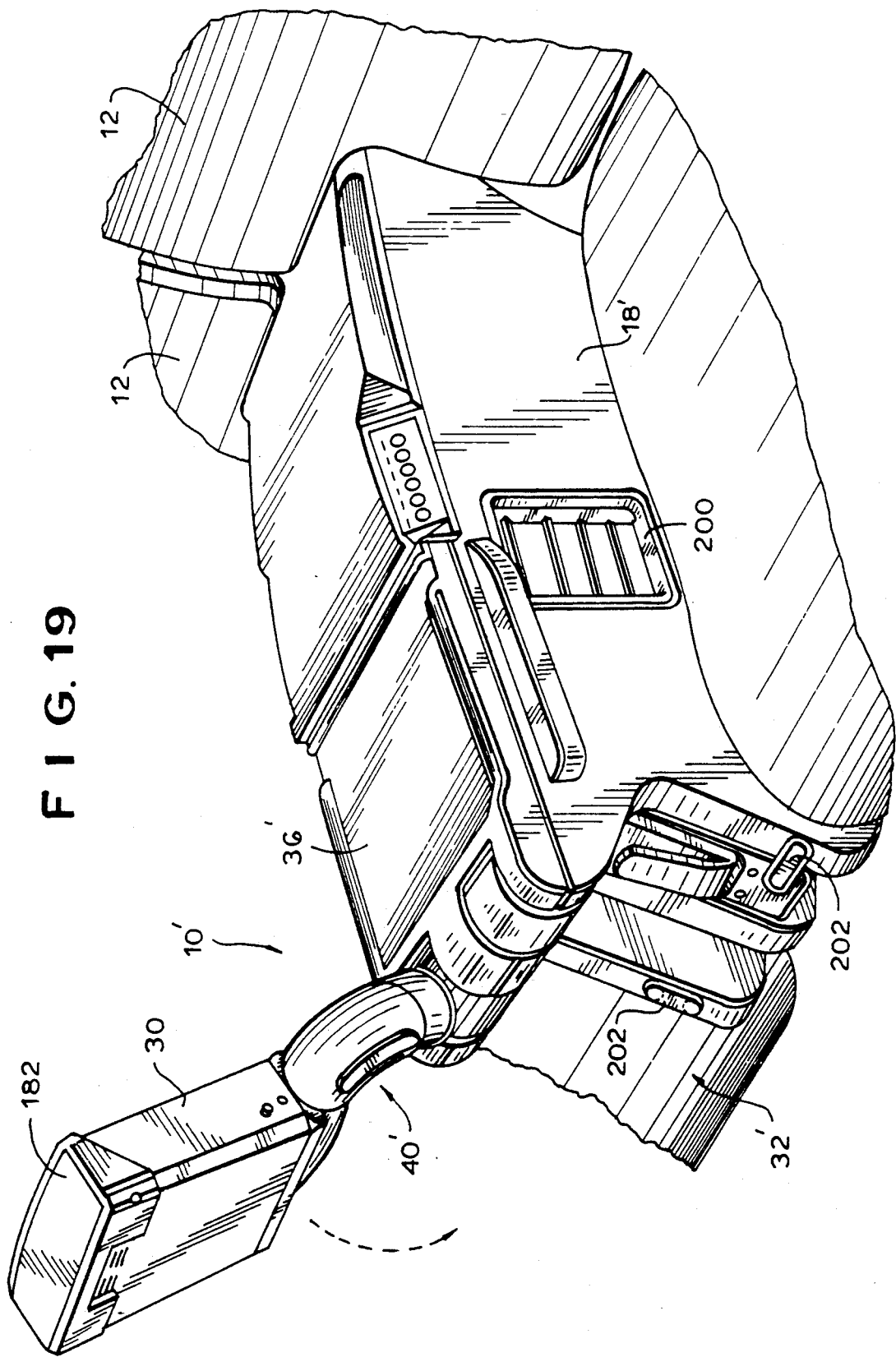

STOWABLE VIDEO DISPLAY ASSEMBLY

BACKGROUND OF THE INVENTION

The present invention relates to a video display assembly and more particularly to such an assembly wherein the video display may be stowed within an armrest of a seat on an aircraft or other vehicle.

European Patent Application 90902831.8 filed Feb. 7, 1990, and published as 0 411 149 A1, and PCT Application Serial No. PCT/JP90/99180 filed Feb. 14, 1990, and published as W090/10403 are both directed to assemblies enabling a television receiver or video display to be stowed (i.e., stored when not in use) within an armrest of a seat on an airplane or other vehicle, but easily removed therefrom to a viewing location. In each case, the video display is pivoted in a vertical plane about a horizontal axis from its stowed location within the armrest upwardly and forwardly (towards the seat in the row ahead), the video display then being pivoted in a horizontal plane about a vertical axis passing through the video display.

One disadvantage in common of such prior art assemblies is that the video display is disposed relatively low, the bottom of the video display barely clearing the top of the armrest, so that the viewer of average height has to bend his/her head downwardly at a sharp angle for viewing. A further disadvantage is that the video display is not centered in front of the viewer, but rather has at least a portion thereof vertically aligned with the armrest so that the viewer, in addition to bending his/her head downwardly at a sharp angle, must also twist his/her head toward the side of that armrest for viewing. Needless to say, even short-term viewing of the video display of such prior art systems is uncomfortable for the average size viewer, and prolonged viewing can lead to severe neck discomfort. Thus, the need remains for a video display which can be stowed within the armrest of a seat, yet in its use orientation is disposed generally centrally in front of the viewer and at a convenient height for the average viewer, thereby to make viewing more comfortable and pleasurable.

In addition to the prior art systems described above failing to make any attempt to provide the video display at a comfortable location for viewing, they fail to provide mechanisms enabling the video display to be tilted back and forth relative to a vertical plane by pivoting about a horizontal axis, thereby to further accommodate not only the height of the average viewer, but also the individual heights of particular viewers (for example, taller viewers preferring a greater degree of tilt, and average viewers preferring a lesser degree of tilt).

Because the prior art systems described above position the video display in use closely adjacent the armrest and relatively remote from a central location in front of the viewer, the video display does not substantially limit the ability of the passenger in the seat in an emergency to bend over and assume the usually recommended crash position or to leave his/her seat swiftly without taking any special action to remove the video display from his/her way. Clearly, a system which centrally locates the video display in front of the viewer would for safety reasons necessarily enable the passenger to easily and rapidly displace the video display out of the way as the passenger during an emergency attempted to assume the crash position or to leave his/her seat, preferably without any particular attention being paid to the need to displace the video display.

Accordingly, it is the object of the present invention to provide a video display assembly wherein the display is movable between a stowed position within the armrest of the vehicle seat and a use position permitting comfortable viewing thereof from such seat by an average viewer.

Another object is to provide such an assembly wherein the video display may be tilted from a generally vertical plane in order to accommodate the particular height of the viewer.

A further object is to provide such an assembly wherein the video display may be forcibly displaced from a use position in the event of an emergency to permit the viewer to take appropriate emergency measures.

It is also an object of the present invention to provide such an assembly which is simple and economical to manufacture, use and maintain.

SUMMARY OF THE INVENTION

It has now been found that the above and related objects of the present invention are obtained in a novel video display assembly. The novel video display assembly comprises a video display and a chamber configured and dimensioned to receive the display when the display is disposed in a first substantially vertical plane. The display is connected to the chamber by an arm having a pair of end portions and a shank portion intermediate the end portions, a proximal one of the end portions being secured to the chamber and a distal other of the end portions being secured to the display. The proximal one arm end portion is pivotable in the first substantially vertical plane relative to the chamber to move the display between a stow orientation wherein the display is stowed in the chamber and an intermediate orientation wherein the display is outside of the chamber. The shank portion is pivotable in a substantially horizontal plane relative to the proximal one arm end portion to move the display between the intermediate orientation and a generally vertical use orientation wherein the display is in a second plane. The distal other arm end portion is pivotable relative to the shank portion to tilt the display between the generally vertical use orientation and a tilted use orientation wherein the display is tilted relative to the second plane for ease of viewing.

In a preferred embodiment, the stowable video display is part of an airplane seat. The proximal one arm end portion is pivotable about a first substantially horizontal axis, the shank portion is pivotable about a generally vertical axis, and the distal other arm end portion is pivotable about a second substantially horizontal axis. The second plane is a generally vertical plane substantially perpendicular to the first substantially vertical plane. The shank portion is pivotable relative to the proximal one arm end through an angle of at least 90°, and the digital other arm end portion is pivotable relative to the shank portion through an angle of not more than about 30°. The assembly includes means to limit the angle through which the proximal one arm end portion, the shank portion and the distal other arm end portion may pivot. The display is forcibly pivotable from either of the tilted and vertical use orientations into a breakaway orientation wherein the display is disposed outside of and entirely below the chamber.

Preferably, the assembly additionally includes means precluding movement of the display to the stowed orientation except from the intermediate orientation. To this end, the assembly includes a pillow block stationary relative to the chamber and an indexing plate disposed intermediate the pillow block and the proximal one arm end portion. The indexing plate is stationary relative to the pillow block under normal use conditions, the one arm end portion being secured to the indexing plate for rotation therewith when the display is not in the intermediate orientation. The indexing plate is forcibly rotatable relative to the pillow block, although means cooperatively defined by the pillow block and the indexing plate frictionally resist relative rotation thereof.

Means are provided for independently setting the frictional resistance to relative rotation between the proximal one arm end portion and the chamber, between the shank portion and the one arm end portion, and between the distal other arm end portion and the shank portion.

In one specific embodiment, the assembly is part of a seat, and the chamber has an open top enabling passage of the display therethrough and includes an armrest cover removably covering the chamber open top. The cover is movable between a first position closing the chamber open top and a second position exposing the chamber open top to permit passage of the display through the chamber open top. The proximal one arm end portion is pivotable relative to the chamber through an angle of about 100°. The shank portion is typically of substantial length, preferably at least 6 inches in length.

In another specific embodiment, the assembly is part of a seat, and the chamber has an open end enabling passage of the display therethrough. The proximal one arm end portion is pivotable relative to the chamber through an angle of about 228°.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjecture with the accompanying drawing wherein:

FIG. 1 is a side elevational view of an assembly according to a first embodiment of the present invention mounted in a seat, with the display being illustrated in the stowed orientation (in dash line), an intermediate orientation (in dash line), three raised viewing orientations (a generally vertical one in solid line and two tilted ones in phantom line), and a lowered breakaway orientation (in solid line), a large man and small woman being illustrated as a frame of reference, both seated (in phantom line) and bent over (in dash line);

FIG. 6 is a fragmentary sectional view taken along the line 6—6 of FIG. 5;

FIG. 7 is a fragmentary sectional view taken along the line 7—7 of FIG. 6;

FIG. 8 is a fragmentary sectional view taken along the line 8—8 of FIG. 7;

FIG. 9 is a fragmentary sectional view taken along the line 9—9 of FIG. 8;

FIG. 12 is a fragmentary sectional view taken along the line 12—12 of FIG. 4;

FIG. 13 is a fragmentary top plan view, partially in section, taken along the line 13—13 of FIG. 12;

FIG. 14 is a top plan view of the console;

FIG. 18 is a side elevational view, similar to FIG. 1, but illustrating apparatus according to the second embodiment;

FIG. 19 is a fragmentary isometric view of a seat illustrating the second embodiment in a use orientation;

DETAILED DESCRIPTION OF PREFERRED EMBODIMENTS

Figure 2:
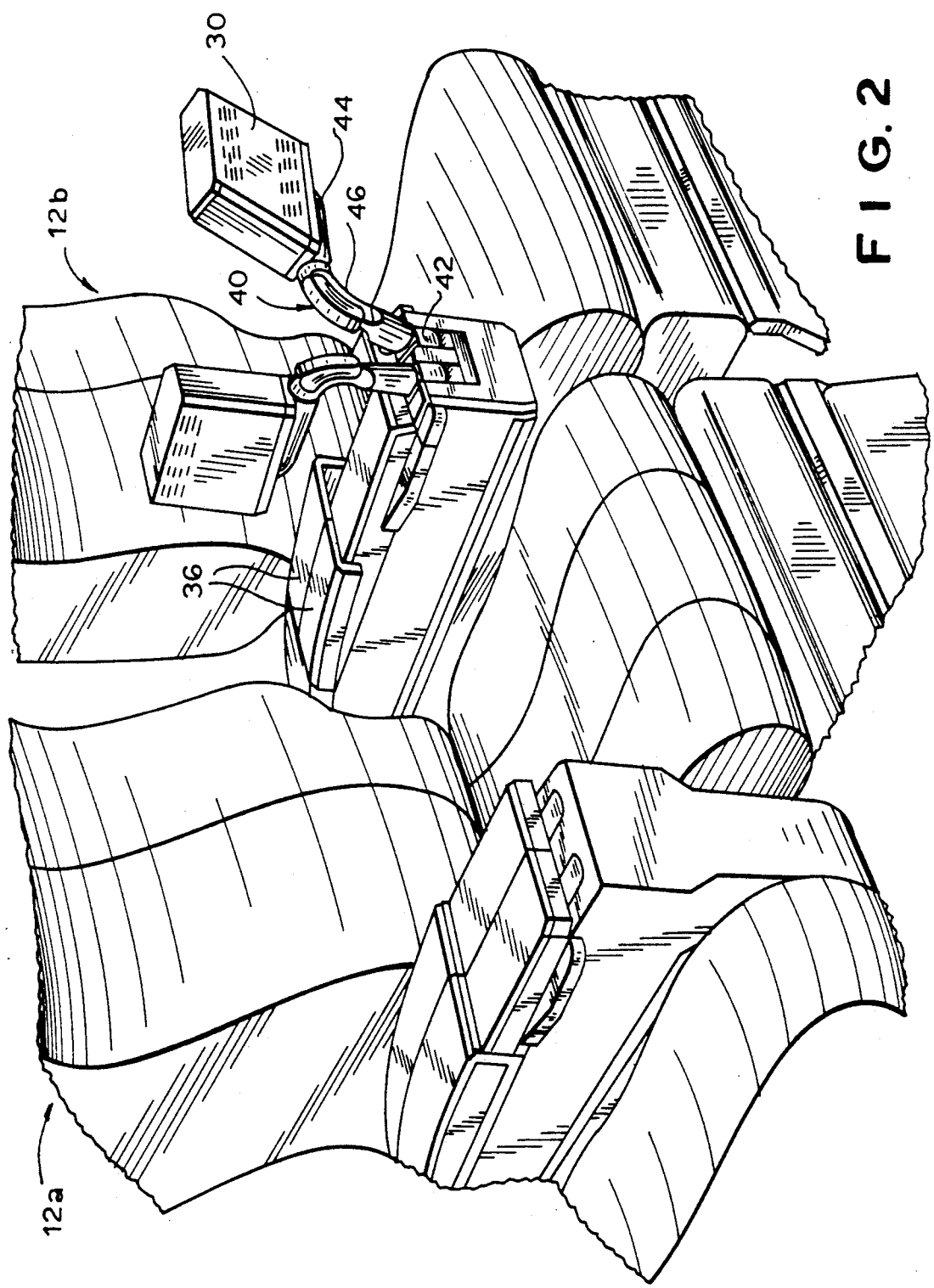
FIG. 2 is a fragmentary isometric view of a row of airplane seats illustrating the first embodiment in various orientations.

Referring now to the drawing, and in particular FIG. 1 thereof, therein illustrated is a video display assembly, generally designated by the reference numeral 10, according to a first preferred embodiment of the present invention. The video display assembly 10 is part of a seat generally designated 12, having a bottom 14, a back 16, and at least one armrest 18. The back 16 of the seat 12 may optionally be movable between an upright position (as illustrated) and a tilted or reclining position. As a frame of reference, a superimposed male FIG. 20 and female FIG. 22 are illustrated in a seated position (in phantom line), with the same figures being illustrated in a bent-over position (in dash line), as might be assumed by the passenger in the event of an emergency according to instructions by the vehicle operator. The seat 12 is illustrated as supported on the floor 24 of the vehicle by conventional braces and supports 26, which may include an adjustable footrest 28. Although the present invention will be described hereinafter with reference to a vehicle seat, and in particular an airplane seat (although similar seats may be employed on trains, and the like), it should be appreciated that the floor 24 may be any floor, whether of a vehicle or not. As illustrated in FIG. 2, a plurality of seats 12a, 12b may be disposed to form a row, with seat 12b at the right of FIG. 2 being identical to seat 12a at the left thereof except that the armrest 18 is disposed on the opposite side thereof, the particular side being selected to accommodate the seating arrangement in the row. A control panel 25 (see FIG. 3), pockets and the like may optionally be disposed on the exterior surface of armrest 18 as well.

Figure 3:
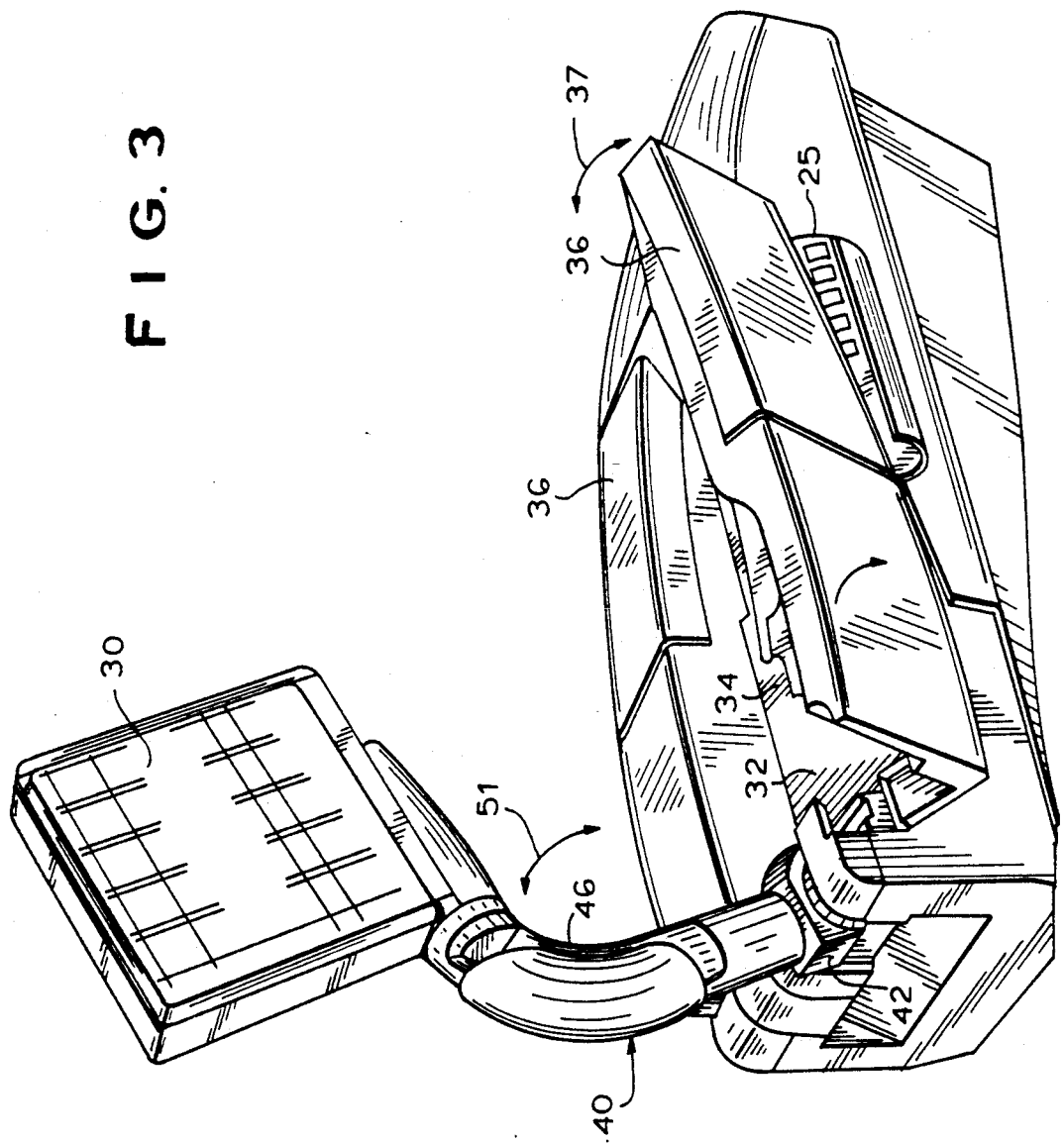
FIG. 3 is a fragmentary isometric view of an armrest according to the first embodiment of the present invention, with the armrest cover being illustrated in an open position and the display being illustrated in an intermediate position.
Figure 4:
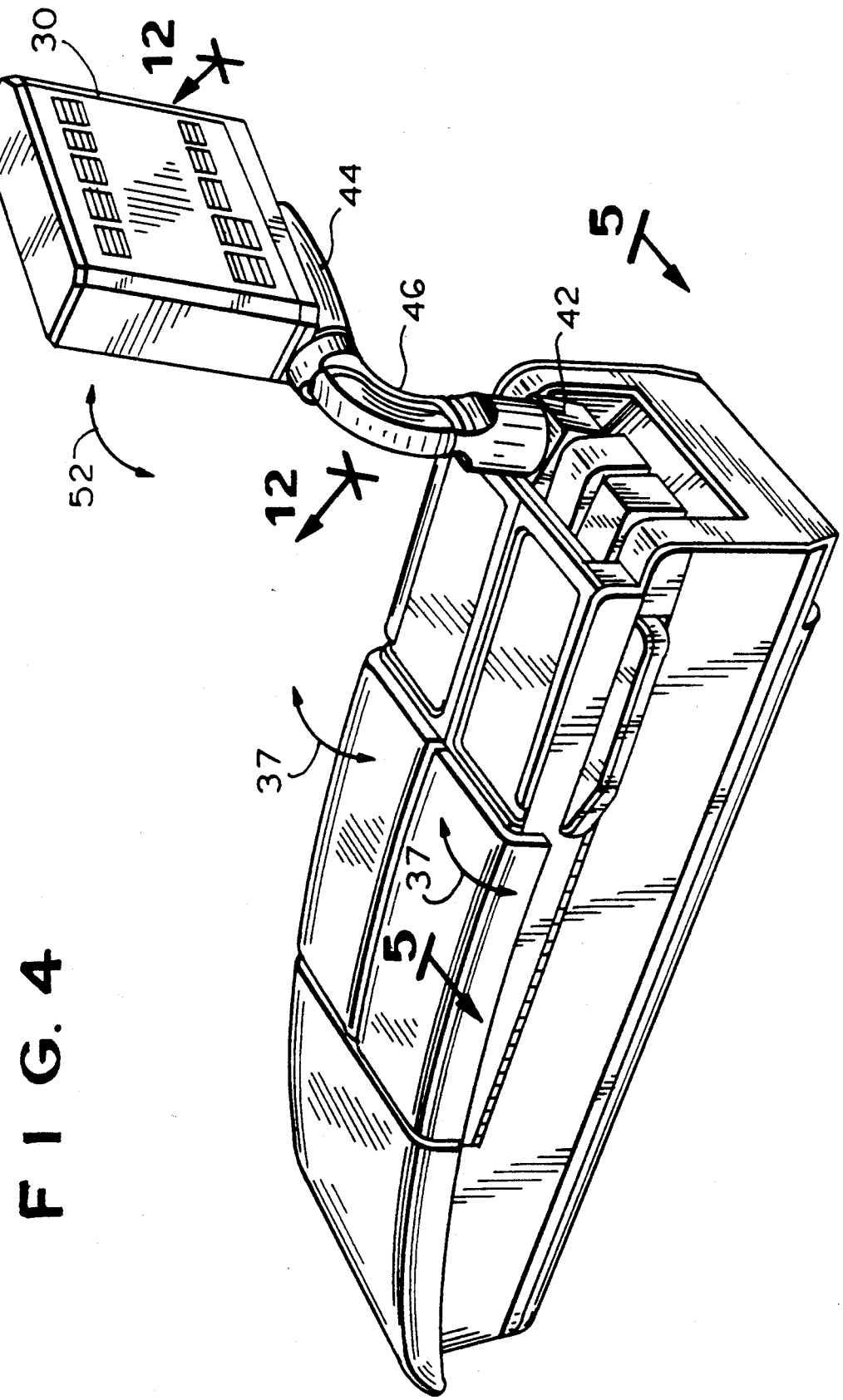
FIG. 4 is a side elevational view, similar to FIG. 3 but with the armrest cover returned to its normal closed position and the display being illustrated in a viewing orientation.

Referring still to FIG. 1 in particular, as a brief overview of the operation of the present invention, the video display assembly unit 10 includes a video display 30 which is typically a conventional small television set.

such as a five inch diagonal liquid crystal display (LCD) unit. The video display 30 in its stowed orientation is disposed in a chamber 32 configured and dimensioned to receive the display 30 when the display is disposed in a first substantially vertical plane (as indicated in dashed line). As best seen in FIG. 3, the chamber 32 has an open top 34 enabling passage of the display 30 therethrough and includes an armrest cover 36 which is pivotable, as indicated by the double headed arrow 37, between a chamber opening orientation, wherein passage of the display 30 through the chamber open top 34 is enabled (as illustrated in FIG. 3), and a chamber closing orientation, wherein the cover 36 covers and thereby closes the chamber open top 34 and serves as an armrest cover upon which the passenger may rest his arm or elbow, regardless of whether or not the display 30 is within or without the chamber 32 (as illustrated in FIGS. 1, 2 and 4).

The display 30 is secured to the seat 12, and more particularly to the chamber 32, by means of an elbow or pivot arm generally designated 40 and curved substantially in the form of a right angle. The pivot arm 40 has a pair of linear end portions 42, 44 and a curved shank or bight portion 46 intermediate and connecting the end portions 42, 44. The proximal end portion 42 is pivotally secured relative to the chamber 32, and the distal end portion 44 is secured to the display 30.

Figure 5:
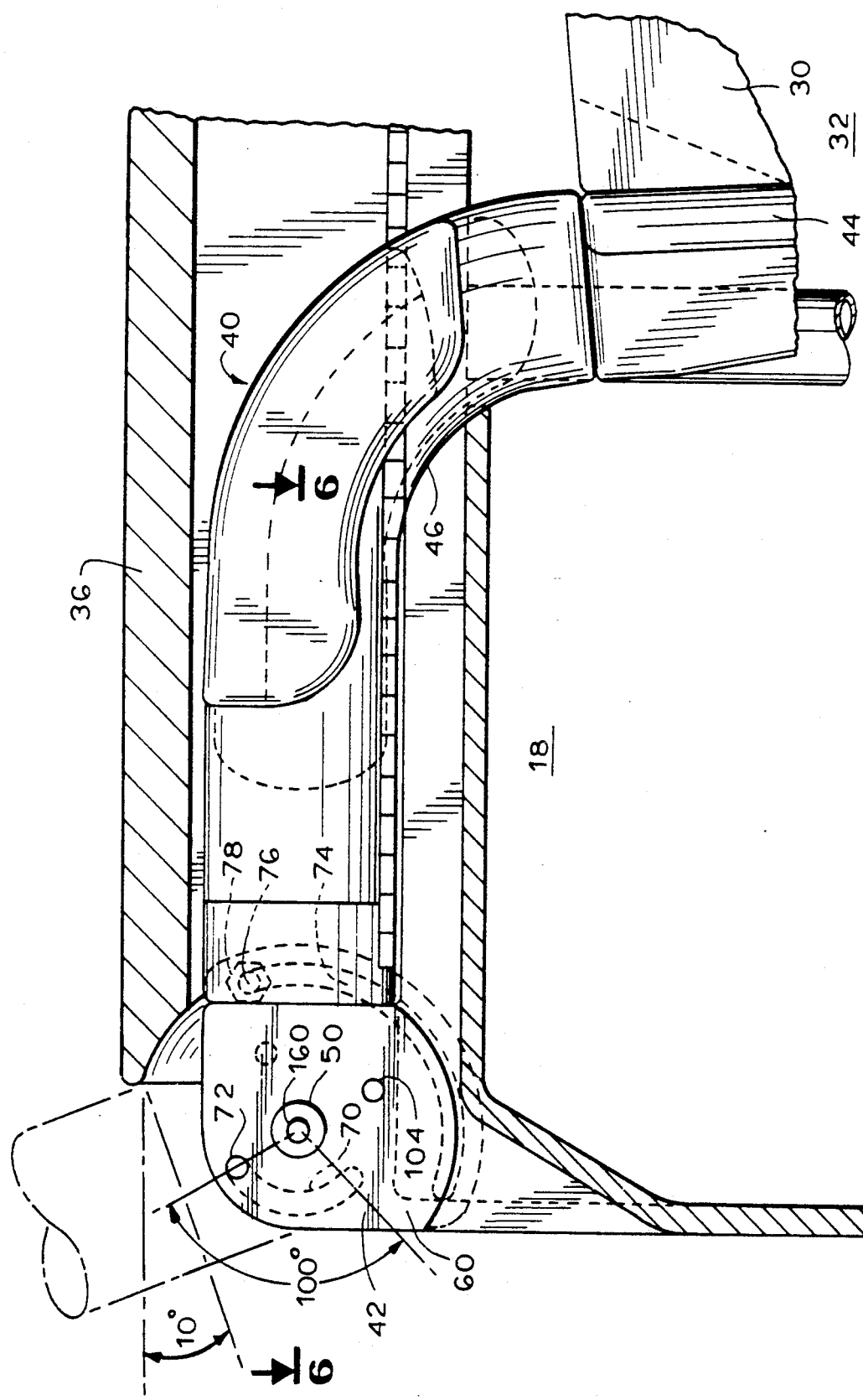
FIG. 5 is a fragmentary side elevational view, partially in cross-section, taken along the line 5—5 of FIG. 4.
Figure 10:
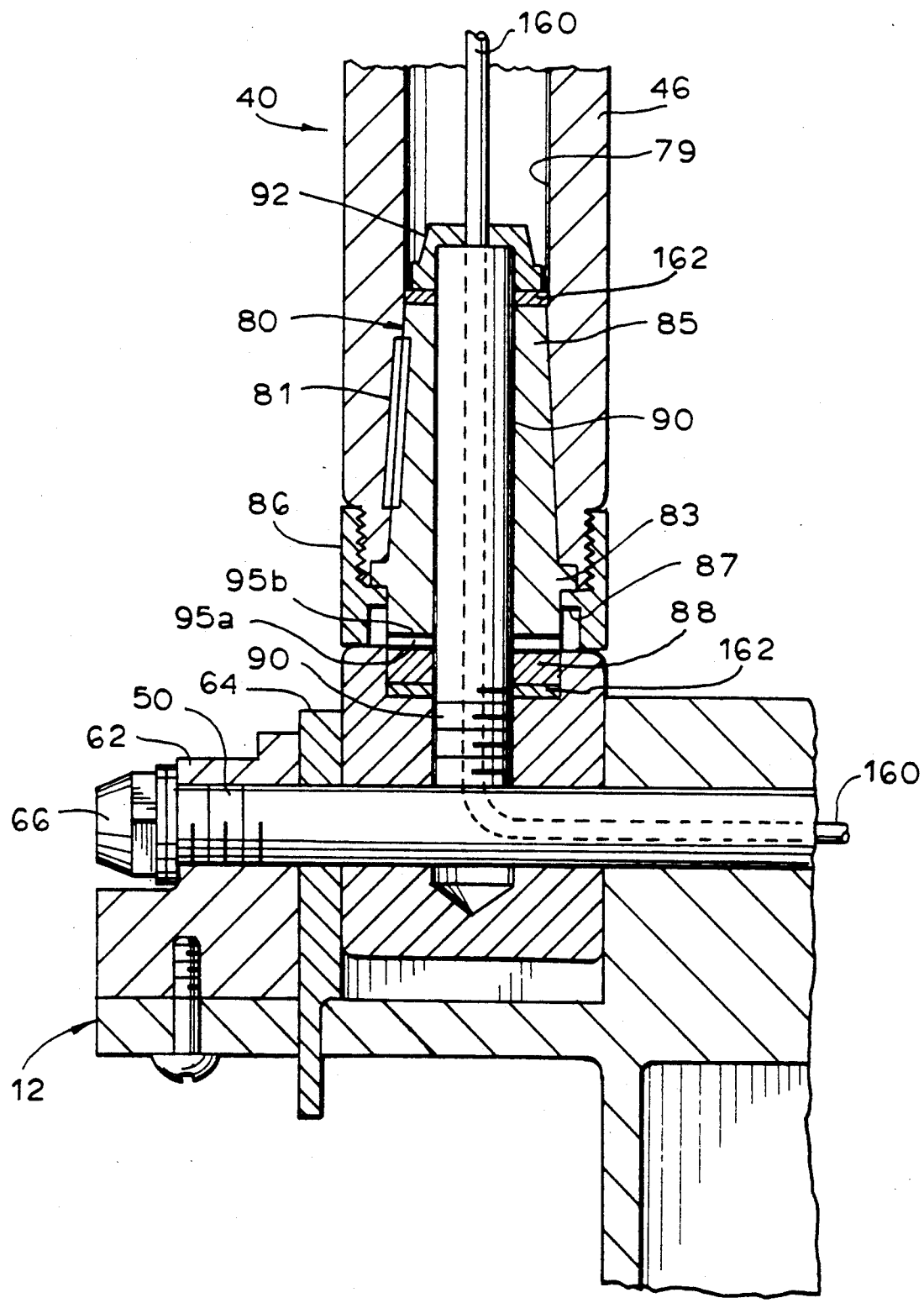
FIG. 10 is fragmentary a sectional assembly view, to an enlarged scale, of apparatus according to the first embodiment.

Referring now in particular to FIG. 3, the proximal arm end portion 42 is pivotable in a first substantially vertical plane relative to the chamber 32, as illustrated by the double headed arrow 51, to move the display 30 between a stowed orientation wherein the display 30 is stowed in the chamber 32 (as illustrated in FIG. 5 and in dash line in FIG. 1) and a generally vertical intermediate orientation wherein the display 30 is disposed outside of the chamber 32 (as illustrated in dash line in FIG. 1, in phantom line in FIG. 5, and on seat 12a of FIG. 2). The pivot pin 50, about which the arm 40 pivots, is disposed in the upper front corner of the chamber 32. Referring now also to FIG. 4, the shank portion 46 of the pivot arm 40 is pivotable in a substantially horizontal plane relative to the proximal arm end portion 42, as indicated by double headed arrow 54, between the aforementioned intermediate orientation and a vertical use orientation wherein the display 30 is in a second plane (as illustrated in FIG. 4, in FIG. 2 attached to seat 12a, and in FIG. 1 by dash lines above the chamber 32). Referring back to FIG. 1 especially, the distal arm end portion 44 adjacent display 30 is pivotable relative to the shank portion 46, as indicated by double headed arrow 54, to tilt the display 30 between the aforementioned generally vertical use orientation and a tilted use orientation wherein the display is tilted relative to the second plane for ease of viewing. (In FIG. 1, the extreme tilted positions of the display 30 are indicated at one extreme in solid line and in the other extreme in phantom line.)

Preferably, the proximal arm end portion 42 is pivotable relative to the chamber through an angle of about 100° so that, when it has been moved from the stowed orientation to the intermediate orientation, it is inclined to the vertical by only about 10°. Further, the shank portion 46 is pivotable relative to the proximal arm end portion 42 through an angle of about 90°, this being adequate to bring the display 30 so that it faces the seated passenger. Finally, the distal arm end portion 44 is pivotable relative to the shank portion 46 through an angle of not more than about 30°, this being adequate to tilt the display 30 from the second plane to the degree necessary to accommodate normal variations in the height of the viewer (about 15° in either direction)

Viewed another way, in order to view the display, the armrest cover 36 is opened (see arrow 37 of FIG. 4). Then the proximal arm end portion 42 is pivoted about a first substantially horizontal axis (the axis being defined by the horizontally disposed pivot pin 50) to enable the display 30 to be brought out of the compartment 32 wherein it is normally stowed (see arrow 51 of FIG. 3). Then the shank portion 46 is pivoted about a generally vertical axis (defined by the proximal arm end portion 42) in order to swing the display 30 from a generally vertical plane transverse to the viewer (and aligned with the plane of chamber 32) into a generally vertical plane parallel to and in front of the viewer (see arrow 52 of FIG. 4). Because the shank portion 46 is of substantial length and is at least partially offset from the axis of the proximal arm end portion 42, the pivoting of the shank portion 46 relative to the proximal arm end portion 42 brings the display 30 not merely generally parallel to the passenger, but also into a position which is laterally centered relative to the seat (and hence the seated passenger). This permits the passenger to look ahead at the display 30 without having to turn his head laterally in the direction of the compartment 32. Finally, the distal arm end portion 44 is pivoted about a second substantially horizontal axis (defined by the adjacent portion of the shank portion 46) in order to permit the display 30 to be tilted relative to the generally vertical plane (see arrow 54 of FIG. 1). This tilting of the display 30 enables the plane of its viewing face or screen to be brought generally into a parallel disposition with the main plane of the passenger's face, thereby to facilitate viewing of the display 30 despite some variation in the height of the passenger.

Completing the description of the basic operation of the arm 40, in the event of an emergency or in order to enable passengers to take precautions in anticipation of an emergency, the display 30 can be quickly and easily displaced from either the generally vertical use orientation or the tilted use orientation (and in fact even from the intermediate orientation) into the breakaway or breakover orientation (illustrated in FIG. 1 in solid line adjacent the bottom of the seat 12), as indicated by double headed arrow 55, thereby to allow the passenger 20, 22 (illustrated upright in phantom line) to assume the bent-over emergency position (illustrated in dash line). Further, the passenger 20, 22 can easily leave his seat since the display 30, moved into the breakover orientation from the intermediate orientation, does not block the passenger from rising to his/her feet, and the display 30, moved into the breakover position from the generally vertical or tilted use orientations, may initially extend across the feet of the passenger, but is easily re-oriented (using either the hand or foot) into a non-blocking orientation (wherein the display 30 is in the same substantially vertical plane as the display 30 in the stowed orientation).

Referring now to FIGS. 5-11, the proximal end portion 42 of the pivot arm 40 is pivotably mounted on main pivot pin 50. The proximal end portion 42 of the pivot arm 40 is commonly referred to as a pivot housing 60, as it enables the arm 40 to pivot about to the main pivot pin 50. Also mounted on the main pivot pin 50 is a pillow block 62, the pillow block being made a fixed (i.e., non-pivotable) part of the seat 12 by a screw 63. An indexing plate 64 is also mounted on the main pivot pin 50 intermediate the pillow block 62 and pivot housing 60 via an internal coaxial washer 65, e.g., made of Delrin. The pillow block 62 is under compression, and the threaded Portion of the main pivot pin 50 extending through the internally threaded aperture of the pivot housing 60 is in tension, with the coaxial friction washer 65 being used as a friction surface between the pillow block 62 and the pivot housing 60. A torque or lock nut 66 on main pivot pin 50, adjacent the surface of the pillow block 62 remote from the indexing plate 64, is used to adjust the degree of friction between the pillow block 62 and pivot housing 60.

In order to limit the motion of the pivot arm 40 so that under normal circumstances it moves the display 30 only between the stowed orientation and the intermediate orientation, the indexing plate 64 defines an arcuate slot 70 which receives a non-retractable pin 72 from the pivot housing 60, such that the pin 72 can traverse an angle of about 100°, thereby allowing the pivot housing 60 to rotate 100° relative to the indexing plate 64, as necessary to move the video display 30 between its stowed orientation within chamber 32 and its generally vertical intermediate orientation outside of chamber 32.

The indexing plate 64 additionally defines an arcuate breakover slot 74 which receives therethrough a bolt 76 extending from the pillow block 62. A nut 78 is fastened to the protruding end of the bolt 76 and is tightened so that the traverse of the bolt 78 along the breakover slot 74 is characterized by added friction between the adjacent surfaces of the nut 78 and the indexing plate 64 about the breakover slot 74. The breakover slot 74 permits movement of the bolt 76 over an angle of 135°, thereby enabling the display 30 to be moved from its generally vertical or tilted use orientation downwardly to its breakover orientation when sufficient force is exerted by the passenger to overcome the additional friction involved in movement of the bolt 76 relative to the breakover slot 74, thus enabling the indexing plate 64 to move relative to the pillow block 62. The ability to move the display 30 to the breakover orientation further reduces the possibility of damage either to the display 30 itself or to the passenger in the event that under turbulent conditions the passenger (and particularly the passenger's head) strikes the display 30. It will be appreciated that the indexing plate 64, while stationary relative to the pillow block 62 under normal use conditions, is pivotable relative thereto through a predetermined angle (preferably 135°) under breakover conditions where additional force is used over that used during normal deployment of the pivot arm 40.

Referring now to FIGS. 6-7 and 10-11 in particular, the shank portion 56 of pivot arm 40 is preferably at least 6 inches in length (along its curved center axis) and defines a sleeve 79 adjacent its functional abutment with the pillow block 60 for partial receipt therein of a cylinder generally designated 80. The cylinder 80 defines a cylindrical proximal portion 82, an intermediate shoulder portion 83 of enlarged diameter, and a gently tapered distal portion 85 adapted to be at least partially disposed within the sleeve 79. The cylinder 80 is pivotably mounted on a threaded shaft 90 integral with the pivot housing 60 and extending outwardly therefrom at a right angle to the main pivot pin 50. A torque or locking nut 92 secured to the end of shaft 90 maintains the cylinder 80 on shaft 90. In order to maintain the tapered distal portion 85 of cylinder 80 within the sleeve 79 of the shaft portion 46 of the pivot arm 40, an internally threaded slip ring 86 is threaded onto the externally threaded end of the sleeve 79, with the radially outwardly extending shoulder 83 of the cylinder 80 becoming trapped between a radially inwardly extending shoulder 87 of the slip ring 86 and the end of the shaft portion 46. It will be appreciated that the slip ring 86 can be rotated in one direction to draw the shaft portion 46 and the cylinder 80 together or reversely rotated in order to separate the two elements and thereby expose the torque or lock nut 92 for adjustment. A key 81 is partially disposed both in a key slot of cylinder distal portion 85 and in a key slot of the sleeve 79 to provide a link between the sleeve 79 and cylinder 80 which precludes relative pivoting of the sleeve and cylinder, thereby ensuring that, as the pivot arm shank portion 46 is rotated, the cylinder 80 is rotated therewith.

Figure 11:
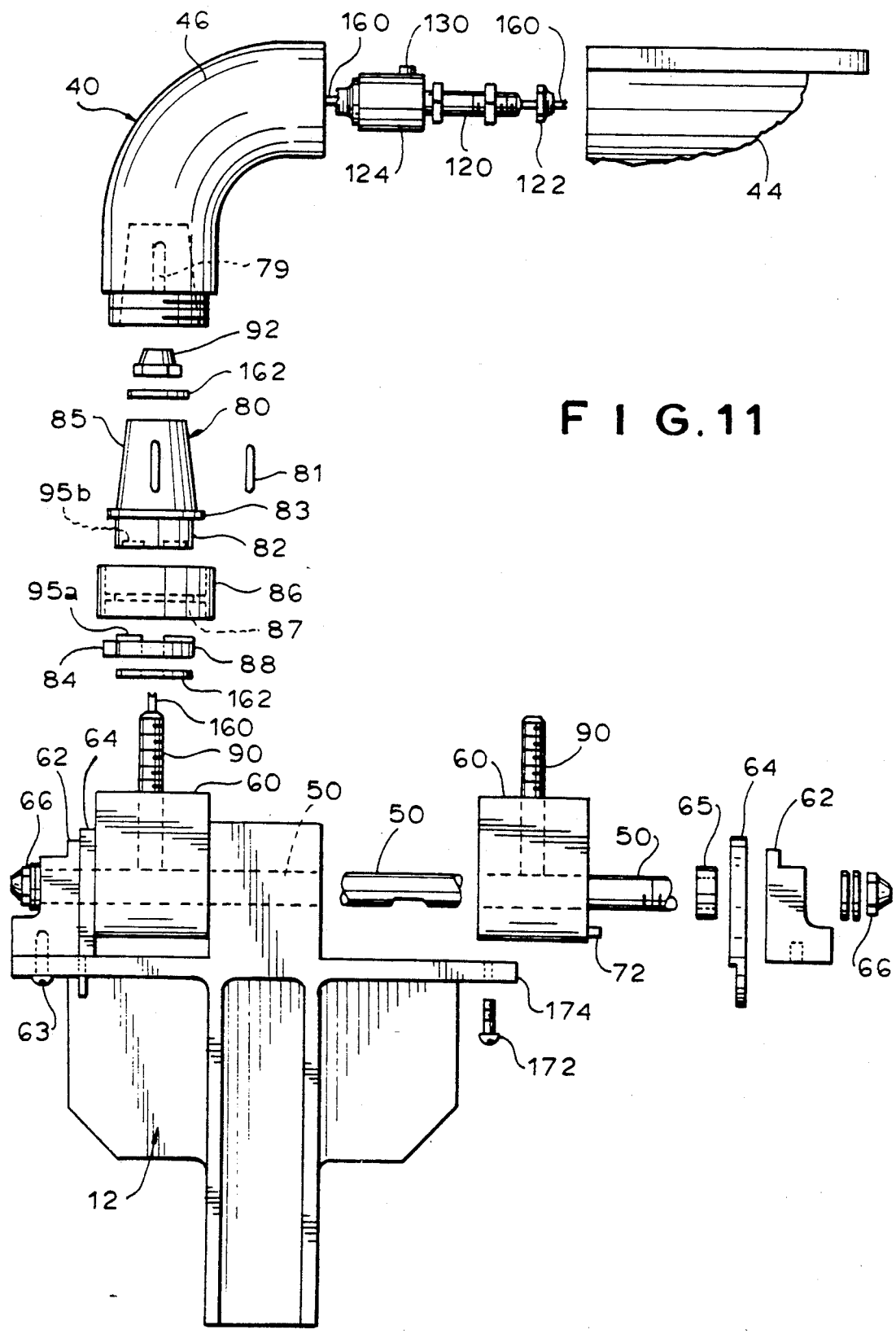
FIG. 11 is a fragmentary exploded isometric view of the pivot arm.

An unthreaded pawl ring 88 defines a radially extending pawl 84 and mates with the cylindrical proximal portion 82 of cylinder 80. One of the opposing surfaces defining a key 95a, and the other of the opposing surfaces defining a keyway 95b, so that the pawl ring 88 and cylinder 80 are joined for rotation together as a unit. As best illustrated in FIG. 11, the distal surface of the pawl ring 88 defines a pair of keys 95a and the proximal surface of the cylinder 80 defines the keyway 95b which engagingly receives the keys of the pawl ring 88. Accordingly, rotation of the shaft portion 46 is transmitted (via the key 81) to the cylinder 80 and hence the pawl ring 88. The pawl ring 88 is disposed within a recess (see FIG. 6) on the distal end of the pivot housing 60 coaxially with the shaft 90. As best seen in FIG. 9, the arcuate channel 89 limits rotation of the pawl 84 and hence the shank portion 46 (via the pawl ring 88, cylinder 80, and key 81) to a predetermined angle of at least 90°, and preferably 90°-135°.

It will be appreciated that while the ability of the pivot arm shank portion 46 to pivot relative to the pivot housing 60 plays an important role in enabling the display 30 to be brought into a convenient viewing portion, it also introduces a problem in that the shank portion 46 must be returned to its original position if the display 30 is to be properly aligned with the open top of the compartment 32, as necessary to enable the display 30 to be subsequently moved to its stowed orientation. As a solution to this problem, means are provided for precluding stowing of the display 30 (or even pivoting of the pivot housing 60 relative to the main pivot pin 50) under normal conditions until the shank portion 46 has been returned to its original orientation. Referring now also to FIGS. 8 and 9, a retractable pin 100 is biased by a spring 102 to project outwardly from the pivot housing 60 into the aperture 104 of indexing plate 64, as illustrated in FIG. 8. Since indexing plate 64 is stationary during normal use, the pivot housing 60 is thus precluded from rotation about the main pivot pin 50. However, as the shank portion 46 (and hence the cylinder 80 and pawl ring 88) is rotated so that the display 30 enters the proper orientation for being stowed within the chamber 32, the radially outwardly extending pawl 84 of pawl ring 88 traveling in arcuate channel 89 contacts and eventually displaces a lever 106 which is pivotably secured at 108 to the retractable pin 100. As the lever 106 is pivoted about its pivot point 110 by the pawl 84, it withdraws the retractable pin 100 from aperture 104 of the indexing plate 64, thus enabling the pivot housing 60 to rotate relative to the main pivot pin 50 as necessary for stowing of the display 30 within the chamber 32.

It will be understood that while the presence of the retractable pin 100 in the aperture 104 of indexing plate 64 precludes pivotal movement of the pivot housing 60 relative to the indexing plate 64. when it is desired to rotate the pivot housing 60 relative to the pillow block 62 to enable the display 30 to enter the breakover orientation, the same may be accomplished by the passenger using the additional force required to overcome the additional friction existing between pillow block 62 and indexing plate 64, thereby enabling indexing plate 64 to be pivoted with pivot housing 60 relative to stationary pillow block 62. The additional force supplied must, of course, be sufficient to overcome the friction applied between indexing plate 74 and nut 78, which friction tends to maintain the indexing plate stationary—that is, non-rotatable relative to the pillow block 62.

Referring now to FIGS. 11–13, the video display 30 is mounted on the distal end portion 44 of the pivot arm 40 for rotation therewith. As the distal end portion 44 supports the display or monitor 30, it is commonly called a monitor base. An externally threaded shaft 120 projects outwardly from the distal end of shank portion 46 of pivot arm 40, projects into and through a portion of monitor base 44, and is secured thereto by a torque or lock nut 122. More particularly, shaft 120 defines an enlarged cylindrical portion 124 disposed within an internally threaded sleeve 126 on the proximal end of the monitor base 44. A cap screw 130 is affixed to the cylinder 124 for rotation therewith, typically after the cylinder 124 is inserted into the sleeve 126 of the monitor base 44. The sleeve 126 defines stops 132 which limit the rotation of the cap screw 130 (and hence the monitor base 44) to 30° relative to the shaft portion 46. The tightness of torque or locking nut 122 on the end of shaft 120 determines the ease with which the display 30 may be tilted, and is preferably relatively high to preclude unintentional movement once the desired tilt is achieved.

It will be appreciated that no precautions are taken to insure that display 30 is in an upright (that is, untilted) position relative to the shank portion 46 before the display 30 can be stowed in chamber 32. As there is only possible a 15° deviation from the upright or normal (i.e., untilted) orientation, the sides of the chamber 32 bearing on the main surfaces of the display 30 appropriately orient the display 30 as necessary for stowage during entry of the display 30 into chamber 32.

It will be appreciated by those skilled in the mechanical arts that in order to prevent unintended or loose movement of the elements of the present invention, the pivot joints afford varying degrees of frictional resistance. Thus, as best seen in FIG. 11, a torque or locking nut 66 is used on the main pivot pin 50 to maintain the pivot housing 60 and pillow block 62 pressed tightly together (via friction washer 65) to resist rotation of the pivot housing 60 under normal use conditions, while still permitting relative movement therebetween. (Nut 78 is used to resist relative rotation of indexing plate 64 and pillow block 62 unless additional force is intentionally applied to achieve (or recover from) a breakaway orientation.) Similarly, the torque or locking nut 122 provides frictional resistance between the monitor base 44 and shaft portion 46 to limit unintentional tilting of the display 30. In both instances the additional frictional resistance afforded by the torque or locking nut 66, 122 is desirable since there is a gravitational component tending to move the display 30. On the other hand, gravity does not tend to move the display 30 between its intermediate vertical orientation and its vertical use orientation, and thus there is required only the relatively slight frictional resistance provided by the torque or locking nut 92. Each of these torque or locking nuts 66, 92, 122 can be independently adjusted to provide a desired level of frictional resistance to pivotal motion for particular joints.

The display 30 receives its audiovisual signals and power by means of a cable 160 which passes through the main pivot pin 50, shaft 90, shank portion 46, shaft 120, and the monitor base 44 into display 30.

As is customary in the mechanical arts, friction washers 162 composed of a linear polyoxymethylene-type sealant resin, such as that available under the tradename Delrin, are interposed between metal surfaces which may rotate relative to each other so as to minimize wear of the metal parts.

Figure 15:
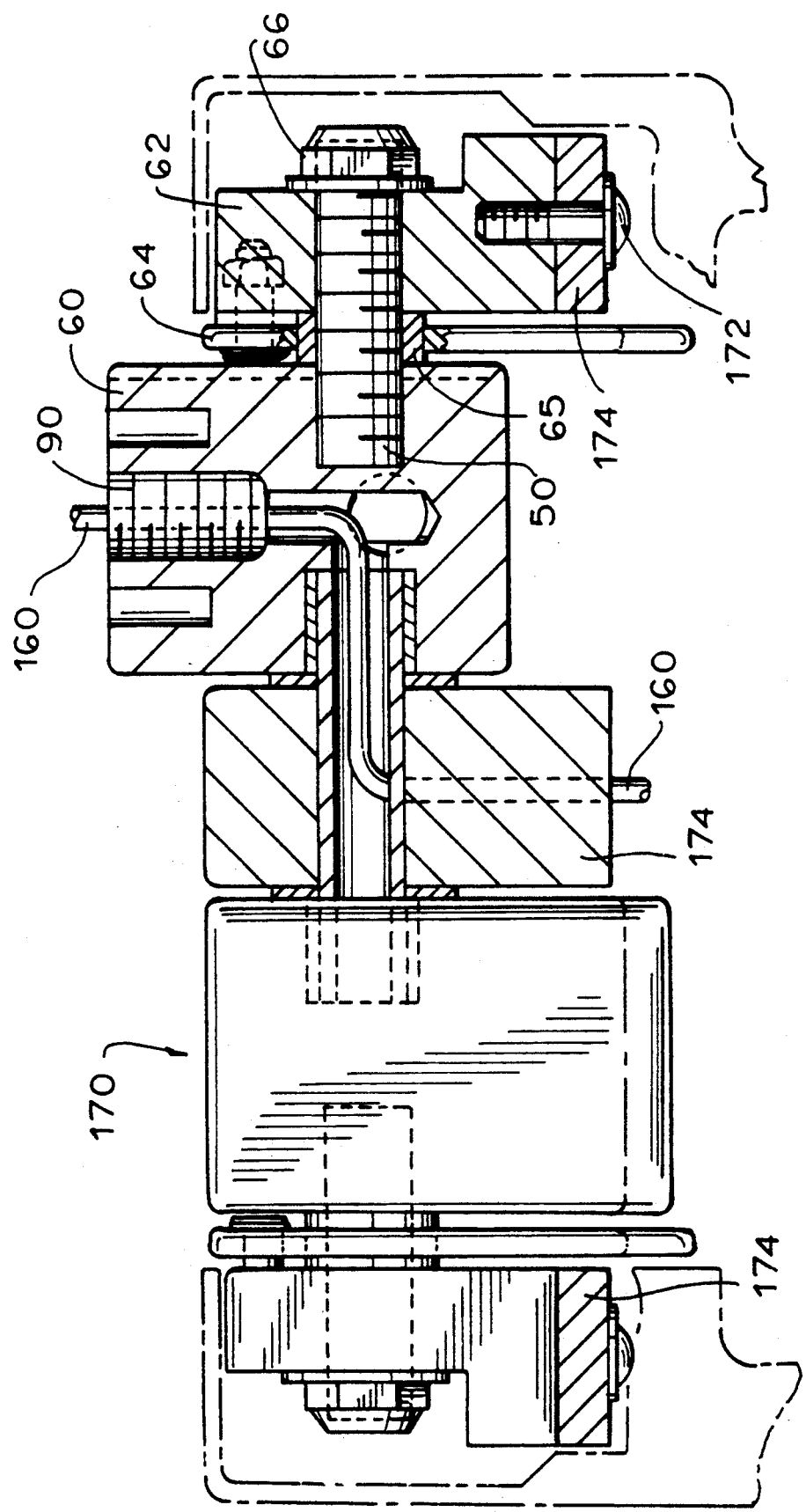
FIG. 15 is a side elevational view taken along the line 15—15 of FIG. 14.

Referring now to FIGS. 11 and 14–15, the assembly of the present invention is typically part of a console generally designated 170, that is mounted as a unit to one or more seats in a row and secured thereto by screws 172 engaging the mounting base 174 thereof.

Figure 16:
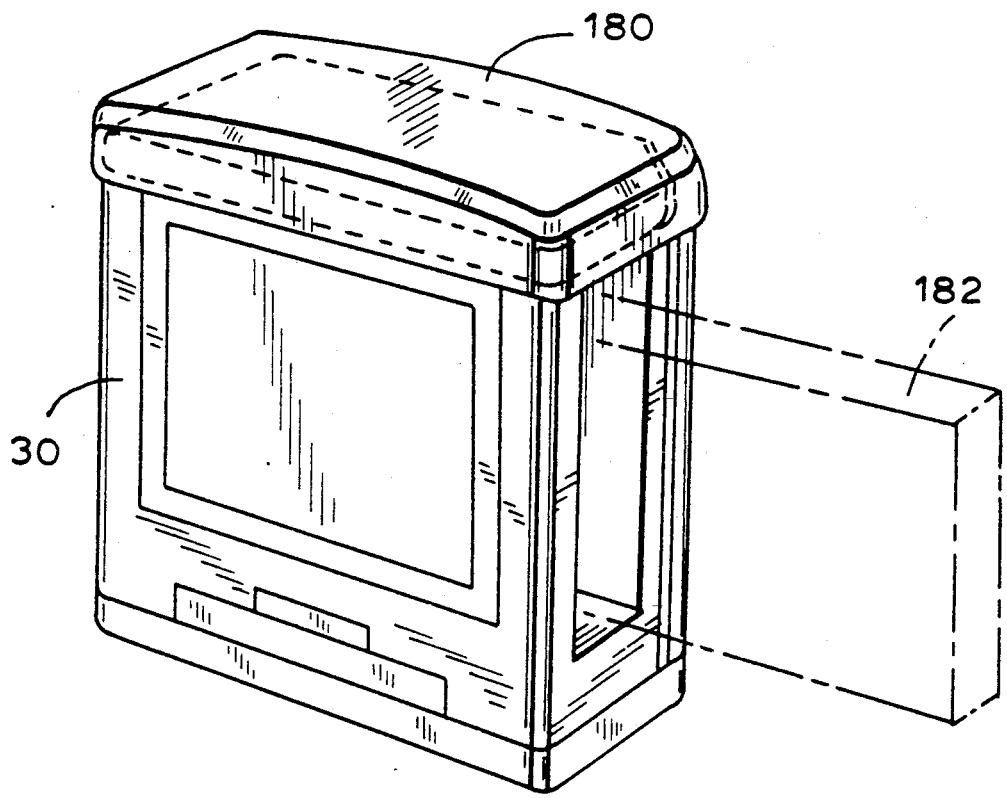
FIGS. 16 and 17 are isometric views from opposite sides of the display having a soft cap thereon.
Figure 17:
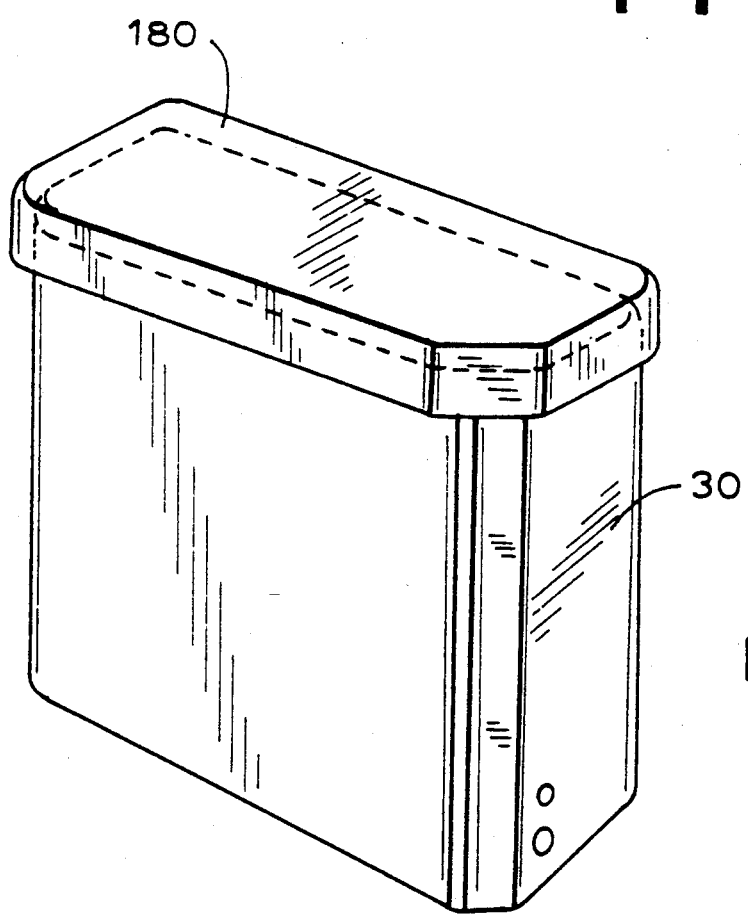

Referring now to FIGS. 16 and 17 in particular, a soft cap 180 is secured to the top of the display 30, for example, by an adhesive, in order to provide cushioning in the event that the passenger (and in particular the head of the passenger) strikes the top of the display 30. The cap 180 is configured and dimensioned so as to facilitate maintenance of the display 30, for example, to permit replacement of a lamp 182 (illustrated in phantom line in a partial removed orientation) which is normally disposed behind the LCD screen in order to provide better illumination thereof. The cap is formed of a suitable soft material, for example, a plastic or rubber such as polyurethane.

For the most part, the assembly is composed of aluminum for an appropriate combination of weight and strength, although other strong, lightweight materials may be used. The various nuts 66, 78, 92, 122, the various shafts 50, 90, 120, and the key 81 are preferably formed of steel in order to provide additional strength. The various washers 65, 162 are preferably formed of a linear polyoxymethylene-type sealant resin, such as that available under the tradename Delrin. The soft cap 180 is preferably formed of polyurethane.

In the first embodiment 10 illustrated in FIGS. 1–17, the display 30 is movable from its stowed position within the compartment 32 upwardly and outwardly through the open top thereof into its use orientation. The compartment 32 occupies the major portion of the armrest 18, as necessary to accommodate not only the display 30 but also the relatively large size pivotal arm 40 necessary to enable display 30 to be brought into a convenient viewing orientation.

Referring now to FIGS. 18 and 19, therein illustrated is a second embodiment 10' of the present invention wherein the display 30' is moved from its stowed orientation within a compartment 32' outwardly and upwardly through the front end (as opposed to the top) of the compartment 32' into its use orientation. As indicated in FIG. 18, the display 30', when moved between its stowed orientation and the generally vertical orientation, travels about 228.5°, as illustrated by the double added arrow 201. The pivot arm 40' is necessarily substantially shorter than pivot arm 40 of the first embodiment (2.5 v. 6.7 inches), so that the pivot arm 40' and display 30' can fit into a much shorter compartment 32'. This permits the rear portion of armrest 18' to house a video tape cassette player within the armrest 18'. Thus the passenger can bring his own video tapes with him and, by inserting them into opening 200 of the tape cassette player, view them on the display 30'. Alternatively, this extra space may be used for other optional items which could be requested by airline customers (i.e., an amenities pocket).

Because the display 30' does not enter and leave the compartment 32' through the top thereof, the armrest cover 36' may be stationary rather than pivotable. However since the display 30' is more prone to being accidentally displaced from compartment 32' of the second embodiment through the front end thereof than display 30' was likely to be accidentally displaced upwardly against gravity through the top of the compartment 32 of the first embodiment, suitable latching means 202 are provided to secure the display 30 within the compartment 32' against accidental displacement.

It will be appreciated that the arcuate slot 70 of the indexing plate 64 must be lengthened and relocated in the second embodiment to enable the greater angle of travel of the display between its stowed orientation and its generally vertical orientation (228.5° as opposed to 110°). All internal mechanisms of the second embodiment 10' are otherwise identical to the corresponding mechanisms of the first embodiment 10' although exterior surfaces may vary somewhat for aesthetic reasons or to enable proper interfacing with the seat.

While the second embodiment does not enable the display 30' to be positioned in the exact same in use location as the first embodiment, it still permits the display 30' to be positioned well above the seat armrest 18 and well across the seat (toward the center thereof) as necessary to facilitate viewing thereof.

Thus, the present invention allows the center point of the video display thereof (assuming the same to be a five inch LCD) to be elevated above the axis of the main pivot pin about 15 inches in the first embodiment 10 and about 10 inches in the second embodiment 10'. This enables the top of the display to be at about shoulder level for the average female and slightly lower for the average male, when the passenger is seated upright. However, it must be considered that, as a seat is moved into a reclining orientation, the shoulder level (and thus the eye level) of the passenger is lower accordingly. On the other hand, while there is a significant difference between the first and second embodiments in terms of how high the display is elevated above the main pivot pin (and thus the armrest of the seat), there is very little difference between the two embodiments in how far the pivot arm brings the display from the armrest across the passenger (thereby to center the display for viewing). The center point of the display is displaced from the intersection of the pivot arm and the main pivot pin laterally about 7 inches in the first embodiment 10 and about 6 inches in the second embodiment 10'. As the seat width typically varies according to the passenger class on an airplane, in some instances such a lateral displacement is sufficient to bring the display at least partially across the passenger's torso, while in other instances it may only bring the display at least partially across the passenger's arm.

To summarize, the present invention provides a video display assembly wherein the display is movable between a stowed position within the armrest of the vehicle seat and a use position permitting comfortable viewing thereof from such a seat by an average viewer. The video display may be tilted from a generally vertical plane to accommodate the height of the viewer and may be forcibly displaced from its use position in the event of an emergency to permit the viewer to take appropriate emergency measures. The assembly is simple and economical to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:
1. A video display assembly comprising:
(A) a video display;
(B) a chamber configured and dimensioned to receive said display when said display is disposed in a first substantially vertical plane; and
(C) an arm having a pair of end portions and a shank portion intermediate said end portions, one of said end portions being secured to said chamber and the other of said end portions being secured to said display;
  (i) said one arm end portion being pivotable in said first substantially vertical plane relative to said chamber to move said display between a stowed orientation wherein said display is stowed in said chamber and an intermediate orientation wherein said display is outside of said chamber;
  (ii) said shank portion being pivotable in a substantially horizontal plane relative to said one arm end portion to move said display between said intermediate orientation and a generally vertical use orientation wherein said display is in a second plane; and
  (iii) said other arm end portion being pivotable relative to said shank portion to tilt said display between said generally vertical use orientation and a tilted use orientation wherein said display is tilted relative to said second plane for ease of viewing.

2. The assembly of claim 1 wherein said one arm end portion is pivotable about a first substantially horizontal axis, said shank portion is pivotable about a generally vertical axis, and said other arm end portion is pivotable about a second substantially horizontal axis.

3. The assembly of claim 1 wherein said shank portion is pivotable relative to said one arm end through an angle of at least 90°.

4. The assembly of claim 1 wherein said other arm end portion is pivotable relative to said shank portion through an angle of not more than about 30°.

5. The assembly of claim 1 wherein said stowable video display is part of an airplane seat.

6. The assembly of claim 1 wherein said display is forcibly pivotable from either of said tilted and vertical use orientations into a breakaway orientation wherein said display is disposed outside of and entirely below said chamber.

7. The assembly of claim 1 wherein said second plane is a generally vertical plane substantially perpendicular to said first substantially vertical plane.

8. The assembly of claim 1 wherein said shank portion is of substantial length.

9. The assembly of claim 1 wherein said shank portion is at least 6 inches in length.

10. The assembly of claim 1 wherein said assembly is part of a seat, and said chamber has an open top enabling passage of said display therethrough and includes an armrest cover removably covering said chamber open top.

11. The assembly of claim 10 wherein said chamber includes a cover mounted on said chamber and movable between a first position closing said chamber open top and a second position exposing said chamber open top to permit passage of said display through said chamber open top.

12. The assembly of claim 10 wherein said one arm end portion is pivotable relative to said chamber through an angle of about 100°.

13. The assembly of claim 10 wherein said one arm end portion is pivotable relative to said chamber through an angle of about 100°, said shank portion is pivotable relative to said one arm end portion through an angle of at least 90°, and said other arm end portion is pivotable relative to said shank portion through an angle of about 30°.

14. The assembly of claim 13 additionally including means to limit the angle through which said one arm end portion, said shank portion and said other arm end portion may pivot.

15. The assembly of claim 1 wherein said assembly is part of a seat, and said chamber has an open end enabling passage of said display therethrough.

16. The assembly of claim 15 wherein said one arm end portion is pivotable relative to said chamber through an angle of about 228°.

17. The assembly of claim 15 wherein said one arm end portion is pivotable relative to said chamber through an angle of about 228°, said shank portion is pivotable relative to said one arm end portion through an angle of at least 90°, and said other arm end portion is pivotable relative to said shank portion through an angle of about 30°.

18. The assembly of claim 17 additionally including means to limit the angle through which said one arm end portion, said shank portion and said other arm end portion may pivot.

19. The assembly of claim 1 additionally including means precluding movement of said display to said stowed orientation except from said intermediate orientation.

20. The assembly of claim 19 additionally including a pillow block stationary relative to said chamber, and an indexing plate disposed intermediate said pillow block and said one arm end portion, said indexing plate being stationary relative to said pillow block under normal use conditions, said one arm end portion being secured to said indexing plate for rotation therewith when said display is not in said intermediate orientation.

21. The assembly of claim 20 where said indexing plate is forcibly rotatable relative to said pillow block.

22. The assembly of claim 21 additionally including means cooperatively defined by said pillow block and said indexing plate for frictionally resisting relative rotation thereof.

23. The assembly of claim 1 additionally including means for independently setting the frictional resistance to relative rotation between said one arm end portion and said chamber, between said shank portion and said one arm end portion, and between said other arm end portion and said shank portion.

24. A video display assembly forming part of a seat comprising:

(A) a video display;
(B) a chamber having an open top and configured and dimensioned to receive said display through said open top when said display is disposed in a first substantially vertical plane;
(C) a cover in the form of an armrest mounted on said chamber and movable between a first position closing said chamber open top and a second position exposing said chamber open top to permit passage of said display through said chamber open top;
(D) an arm having a pair of end portions and a shank portion intermediate said end portions, one of said end portions being secured relative to said chamber and the other of said end portions being secured to said display;
  (i) said one arm end portion being pivotable in said first substantially vertical plane relative to said chamber about a first substantially horizontal axis through an angle of about 100° to move said display between a stowed orientation wherein said display is stowed in said chamber and an intermediate orientation wherein said display is outside of said chamber,
  (ii) said shank portion being of substantial length and pivotable relative to said one arm end portion about a generally vertical axis through an angle of at least 90° to move said display between said intermediate orientation wherein said display is in said first substantially vertical plane and a generally vertical use orientation wherein said display is in a second generally vertical plane substantially perpendicular to said first substantially vertical plane, and
  (iii) said other arm end portion being pivotable relative to said shank portion about a second generally horizontal axis through an angle of not more than about 30° between said generally vertical use orientation and a tilted use orientation wherein said display is tilted relative to said second generally vertical plane for ease of viewing; and
(E) means to limit the angle through which said one arm end portion, said shank portion and said other arm end portion may pivot.

25. A video display assembly forming part of a seat comprising:

(A) a video display;
(B) a chamber having an open end and configured and dimensioned to receive said display through said open end when said display is disposed in a first substantially vertical plane;
(C) an arm having a pair of end portions and a shank portion intermediate said end portions, one of said end portions being secured relative to said chamber and the other of said end portions being secured to said display;
  (i) said one arm end portion being pivotable in said first substantially vertical plane relative to said chamber about a first substantially horizontal axis through an angle of about 228° to move said display between a stowed orientation wherein said display is stowed in said chamber and an intermediate orientation wherein said display is outside of said chamber,
  (ii) said shank portion being pivotable relative to said one arm end portion about a generally vertical axis through an angle of at least 90° to move said display between said intermediate orientation wherein said display is in said first substantially vertical plane and a use orientation wherein said display is in a second generally vertical plane substantially perpendicular to said first substantially vertical plane, and (iii) said other arm end portion being pivotable relative to said shank portion about a second generally horizontal axis through an angle of not more than about 30° to tilt said display relative to said second generally vertical plane for ease of viewing: and (D) means to limit the angle through which said one arm end portion, said shank portion and said other arm end portion may pivot.

* * * * *